(12) United States Patent
Narayanaswamy et al.

(10) Patent No.: US 8,609,900 B2
(45) Date of Patent: Dec. 17, 2013

(54) DENDRITIC MACROMOLECULE AND A PROCESS THEREOF

(75) Inventors: Jayaraman Narayanaswamy, Karnataka (IN); Jayamurugan Govindasamy, Karnataka (IN)

(73) Assignee: Indian Institute of Science, Bangalore, Karnataka (IN)

( * ) Notice: Subject to any disclaimer, the term of this patent is extended or adjusted under 35 U.S.C. 154(b) by 218 days.

(21) Appl. No.: 12/452,430

(22) PCT Filed: Aug. 14, 2007

(86) PCT No.: PCT/IN2007/000344
§ 371 (c)(1),
(2), (4) Date: May 14, 2010

(87) PCT Pub. No.: WO2009/004639
PCT Pub. Date: Jan. 8, 2009

(65) Prior Publication Data
US 2010/0297104 A1    Nov. 25, 2010

(30) Foreign Application Priority Data

Jul. 4, 2007 (IN) ............................ 1435/CHE/2007

(51) Int. Cl.
*C08G 73/02* (2006.01)
*C07C 217/42* (2006.01)
*C07C 213/00* (2006.01)
*C07C 229/22* (2006.01)
*C10M 149/14* (2006.01)

(52) U.S. Cl.
USPC ........... 564/505; 564/491; 564/503; 564/504; 564/512; 558/316; 558/447; 558/454; 558/455; 560/169; 508/476

(58) Field of Classification Search
None
See application file for complete search history.

(56) References Cited

PUBLICATIONS

Jayaraman et al., J. Organic Chemistry (2003), 68, p. 9694-9704.*
Jayaraman et al., Tetrahedron (2005), 61, p. 4281-4288.*
Jayaraman et al., Tetrahedron (2004), 60, p. 10325-10334.*

* cited by examiner

*Primary Examiner* — Brian J Davis
(74) *Attorney, Agent, or Firm* — Nath, Goldberg & Meyer; Joshua B. Goldberg; Tanya E. Harkins

(57) ABSTRACT

The present invention is in relation to a dendritic molecule having symmetrically sited branches having four or more generations of dendrimers wherein the branch points are tertiary amines linked together with oxygen atom of ether and the heteroatoms are separated by a substituted or non-substituted linear three methylene linker. In addition the invention also provides a process to prepare such dendritic macromolecules.

18 Claims, No Drawings

DENDRITIC MACROMOLECULE AND A PROCESS THEREOF

This is a national phase Application of PCT/IN2007/000344, filed 14 Aug. 2007, claiming priority benefit from IN Application No. 1435/CHE/2007, filed 4 Jul. 2007, the entire content of which is hereby incorporated by reference.

FIELD OF INVENTION

The present invention is in relation to dendritic macromolecules. More particularly, the present invention is in relation to establishing constitutionally new dendritic macromolecules, presenting many surface functional groups, each functional group presenting a unique reactivity pattern. These new dendritic macromolecules are capable of acting as base platforms for further modifications, aided by, for example, surface functional groups or the defined inner cavities present within these dendritic macromolecules.

BACKGROUND AND PRIOR ART OF THE INVENTION

Dendritic macromolecules represent a new type of polymeric architecture, which has become popular in a variety of studies, including application level, in the last two decades. The branches-upon-branches is an unique architectural feature of these macromolecules and they enjoy being the most monodispersed of all synthetic macromolecules.

The systematic studies of the dendritic macromolecules may be traced back first to the series of the so-called poly (amido amine) or Starburst dendrimers, pioneered by Tomalia and co-workers, Polym. J. (Tokyo), 117 (1985), U.S. Pat. No. 4,507,466; U.S. Pat. No. 4,558,320 and U.S. Pat. No. 4,737,550. These dendrimers possess primarily an amide as the linkage unit and a tertiary amine as the branch point. Another popular dendritic macromolecular series is the poly (propylene imine) dendrimers, advanced by Meijer and de Brabander-van den Berg, Angew. Chem. Int. Ed. Engl. 1308 (1993), WO 93/14147, U.S. Pat. No. 5,698,662. In this poly (propylene imine) dendrimer series, there is no heteroatom or linker functionalities between the branch points, that are constituted by tertiary amines. The branch points are separated typically by alkylene units. Other popular dendrimers studied extensively, are by Fréchet and co-workers, J. Am. Chem. Soc. 7638 (1990); Majoral and co-workers, Science, 1981 (1997) and Fréchet and co-workers U.S. Pat. No. 5,041,516. Low molecular weight poly (propyl ether imine) dendritic molecules with ether linkages and imine branch points wherein the molecular weight is less than 3600 g/mol, with ester units at the surfaces has been described in, Rama Krishna and Jayaraman, J. Org. Chem. 2003, 9694. Although four and higher generation dendrimers were highly desired as the same has more versatility than an third and lower generation dendrimers, it was found that fourth and higher generation dendrimers could not be constructed by the protocol that yielded dendrimers up to three generations.

Each dendrimer is characterized by its unique constitution and thus attendant physico-chemical and biological properties differ significantly. Although there exists a number of dendrimers, the ones that have been utilized in a wide range of studies remain limited. The poly(amido amine) and poly(propylene imine) dendrimers are the most studied dendritic macromolecules, in general. Due to the physico-chemical properties that reside with the molecular constitution of the dendrimers, identification of new monomers and synthesis of new dendrimers are important target areas in the branch of polymer/macromolecular science and technology. It is also necessary to achieve higher and higher generational dendrimers as each such higher generation dendrimer improves the scope of application of such dendrimers. A large number of technologically important utilities such as those in power, energy, healthcare, medical, engineering, consumer goods, environmental, electronics and optoelectronics are expected to benefit by the unique architectural characteristics of the dendritic macromolecules.

OBJECTS OF THE PRESENT INVENTION

The principal object of the present invention is in relation to preparation of dendritic macromolecules with four or more generations; the said dendrimers being with ether linkages and tertiary amine branch points.

SUMMARY OF INVENTION

Accordingly, the present invention provides a dendritic macromolecule having symmetrically sited branches, wherein the branch points are tertiary amines, the branches linked together through linkers comprising oxygen atom corresponding to an ether, and the heteroatoms are separated by a substituted or non-substituted linear three methylene linker; and a process for preparing a dendritic macromolecule of four generations or more comprises steps of: reacting the alcohol units of the lower dendritic molecule to react with molar equivalents of α,β-unsaturated nitrile, in the presence of an alkali, to install nitrile groups at the surfaces of the dendritic macromolecule; converting the nitrile groups at the surfaces of the dendritic macromolecule to the corresponding amines, mediated by supported metal catalysts and hydrogen gas; subjecting the resulting amine functional groups to react with α,β-unsaturated esters; converting the ester units present at the surfaces of the dendritic macromolecule to the corresponding alcohol units, mediated by metal hydride reagents; to prepare a higher generation dendritic molecule wherein.

DETAILED DESCRIPTION OF THE INVENTION

The present invention is in relation to a dendritic macromolecule having symmetrically sited branches, wherein the branch points are tertiary amines, the branches linked together through linkers comprising oxygen atom corresponding to an ether, and the heteroatoms are separated by a substituted or non-substituted linear three methylene linker.

In another embodiment of the present invention, wherein the number of symmetrically sited branches, are ranging from 3 to 8 and the number of peripheral groups ranging from 16 to 512.

In yet another embodiment of the present invention, wherein the substituents on the linkers are selected from a group comprising an alkyl, branched alkyl and aryl group.

In still another embodiment of the present invention, wherein the alkyl, branched alkyl and aryl substituents in the linear three methylene linker are present on two adjacent methylene groups and the third unsubstituted methylene group is present on left to the heteroatoms.

In still another embodiment of the present invention, wherein the functional group present at the periphery of the dendritic macromolecule is selected from a group comprising alcohol, amine, ester, nitrile and carboxylic acid or a combination thereof.

In still another embodiment of the present invention, wherein said molecule is useful in the delivery of drug molecules, fragrant molecules, antibodies, antigens, nucleotides, nucleosides, peptides, proteins and as lubricants in automotive oils.

In still another embodiment of the present invention, wherein repeating unit of the dendritic macromolecule is:

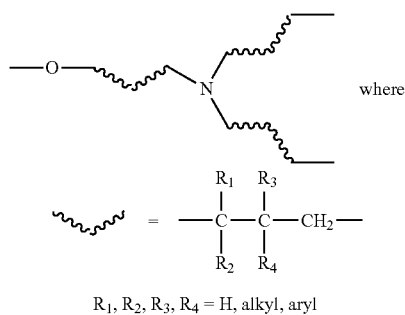

$R_1, R_2, R_3, R_4$ = H, alkyl, aryl

The present invention is in relation to a process for preparing a dendritic macromolecule comprises steps of,
i. reacting the alcohol units of the lower dendritic molecule to react with molar equivalents of α,β-unsaturated nitrile, in the presence of an alkali, to install nitrile groups at the surfaces of the dendritic macromolecule;
ii. converting nitrile groups at the surfaces of the dendritic macromolecule to the corresponding amines, mediated by supported metal catalysts and hydrogen gas;
iii. subjecting the resulting amine functional groups to react with α,β-unsaturated esters.
iv. converting ester units present at the surfaces of the dendritic macromolecule to the corresponding alcohol units, mediated by metal hydride reagents; to prepare a higher generation dendritic molecule; wherein construction of fourth and higher generation dendrimer is enabled by one or more of additional inventive process steps. In one embodiment of the present invention, the lower dendritic molecule is one generation lower than the target dendritic molecule.

In another embodiment of the present invention, the molar equivalents of α,β-unsaturated nitrile is 4-50 molar equivalent per unit of the hydroxyl group present in the dendritic molecule.

In yet another embodiment of this invention, the excess of α,β-unsaturated nitrile is added in installments are an interval. In a preferred embodiment, the addition is made in three installments, one at the beginning, second at an interval of 8 hours from first addition and third at 15 hours after second addition.

In still another embodiment of the present invention, the alkali used is 40% aqueous solution of sodium hydroxide;

In still another embodiment of the present invention, wherein the catalyst is selected from a group of metal supported catalysts such as Raney alloys; preferably Raney Cobalt.

In still another embodiment of the present invention, the concentration of nitrile ranges between 0.01 mM and 4.0 mM.

In still another embodiment of the present invention, the metal hydride reagent is selected from a range of metal hydride reagents preferably lithium aluminum hydride.

In still another embodiment of the present invention, by-products 2-cyano ethanol and bis-nitrile are removed from reaction mixture by a combination of liquid:liquid extraction and distillation before the higher generation dendrimer is subjected to further addition of next generation.

In still another embodiment of the present invention the four and higher generation dendrimers are applied in the delivery of drug molecules, fragrant molecules, antibodies, antigens, nucleotides, nucleosides, peptides, proteins and as lubricant in automotive oils.

The innovation deals with the preparation of dendritic macromolecules wherein the characteristics of the general framework/scheme/sequence of steps of process of production of the preparation comprises (i) reaction of an α,β-unsaturated nitrile with a compound presenting a number of hydroxyl groups at the surfaces, in the presence of an alkali; (ii) reduction of the compound resulting from step (i) to a compound containing several symmetrically substituted amine functional groups, by supported metal catalysts; (iii) reacting the compound resulting from step (ii) with an α,β-unsaturated ester, leading to the formation of several symmetrically substituted ester functional groups at the surfaces; (iv) subjecting the compound resulting from step (iii) to a reduction reaction with a metal hydride based reagent, so as to form a product with several symmetrically substituted hydroxyl group containing dendritic macromolecule. The number of the hydroxyl group present in the dendritic macromolecule, after the above four steps, is to a maximum of twice that number present in the compound used in step (i).

This invention describes dendritic macromolecules with a well-defined chemical constitution. The chemical constitution comprises a linkage group and a branching group. The presence of both the linkage group and the branching group are required simultaneously in the chemical constitution of the dendritic macromolecules of this invention. An α,β-unsaturated ester and a nitrile act as the monomers. These two types of monomers are taken through covalent bond formation and subsequent functional group conversions. While the covalent bond formations create the unique linkage and the branching groups, the functional group conversion generates a different functional group capable of undergoing the covalent bond formation, leading to the formation of the linkage and branching groups. The functional group conversions and the covalent bond formations are conducted alternatively to prepare the dendritic macromolecules of the present invention.

Every symmetrically sited branching group is considered to constitute a generation. Thus the branching group nearest to the central atom or unit or the core of the dendritic structure is treated as the first generation. The next symmetrically placed branching groups are treated to complete the second generation dendritic structure. The progressive next symmetrically placed branching groups are treated to complete the third generation dendritic structure and so on. With the branching group multiplicity of 2 and the central atom or unit or core of the dendritic macromolecule multiplicity of 2, the maximum number of surface groups possible in each generation is twice the number that is present in the corresponding immediate lower generation dendritic structure. Thus, the first generation dendritic structure with 2 symmetrically placed branching groups can have at the maximum 4 surface functionalities or units; the second generation dendritic structure with 4 symmetrically placed branching groups can have at the maximum 8 surface functionalities or units; the third generation dendritic structure with 8 symmetrically placed branching groups can have at the maximum 16 surface functionalities or units; the fourth generation dendritic structure with 16 symmetrically placed branching groups can have at the maximum 32 surface functionalities or units; the fifth generation dendritic structure with 32 symmetrically placed branching groups can have at the maximum 64 surface functionalities or units; the sixth generation dendritic structure with 64 symmetrically placed branching groups can have at the maximum 128 surface functionalities or units; the seventh generation dendritic structure with 128 symmetrically placed branching groups can have at the maximum 256 surface functionalities or units and the eighth generation dendritic structure with 256 symmetrically placed branching groups can have at the maximum 512 surface functionalities or units.

The functionalities, that undergo covalent bond formation upon reaction with nitriles and esters in the present invention, are primarily alcohols and amines. These functional groups are generated in prior reactions through the type chemical reactions called functional group conversions.

The low molecular weight dendritic scaffolds disclosed by Rama Krishna & Jayaraman (2003) are incorporated as a reference, in the present invention. Repetitive and consecutive reactions, corresponding to the conversion of (i) esters to alcohols; (ii) alcohols to ethers, possessing pendant nitriles; (iii) nitriles to primary amines and (iv) primary amines to tertiary amines, possessing pendant esters, constitute to be the integral steps involved in the construction of the dendritic macromolecules of Rama Krishna & Jayaraman (2003) which were reported to have been constructed up to three generations by convergent as well as divergent construction strategy. However, further to third generation construction by the protocol given by Rama Krishna & Jayaraman (2003), although four generation dendrimer or higher generation dendrimer was highly desired as the same has more versatility than an third generation dendrimer, it was found that fourth generation dendrimer or higher could not be constructed by straightforward application of the protocol that yielded up to three generations. Further work was undertaken to establish fourth generation and higher generation dendrimers. In addition to the invention of a series of new dendritic macromolecules, invention relating to the improvements of the protocol adopted in Rama Krishna & Jayaraman (2003) were also achieved. A substantial part of the accomplishments are published in the publication "Synthesis of large generation poly (ether imine) (PETIM) dendrimers", Jayamurugan, G; Jayaraman, N. *Tetrahedron* 2006, 62, 9582-9588 (publication date Aug. 17, 2006) and also forms subject matter of this patent application.

Since dendrimers with generations higher than three were highly desired on account of their higher efficiency for the intended applications, work was undertaken to establish dendrimers higher than three generations and, in the process, find out what improvements are needed in the protocol adopted by Rama Krishna & Jayaraman (2003) so that fourth and higher generations can be constructed. This invention also covers the improvements made in the protocol to enable construction of four generations and higher dendrimers, at least up to 8th generation where the branch points are tertiary amines, the branches are linked together through linkers comprising oxygen atom corresponding to an ether, and the heteroatoms are separated by a substituted or non-substituted linear three methylene linker. This invention also covers dendrimers where the branch points are tertiary amines, the branches are linked together through linkers comprising oxygen atom corresponding to an ether, and the heteroatoms are separated by a substituted or non-substituted linear three methylene linker, and having four to eight generations, including eighth generation. This invention also covers dendrimers where the branch points are tertiary amines, the branches are linked together through linkers comprising oxygen atom corresponding to an ether, and the heteroatoms are separated by a substituted or non-substituted linear three methylene linker, and having more than eight generations that can be constructed using the process of this invention.

This invention also includes an embodiment wherein a dendrimer having branch points as tertiary amines, the branches being linked together through linkers comprising oxygen atom corresponding to an ether, and the heteroatoms being separated by a substituted or non-substituted linear three methylene linker have, on their surface, one or more of a functional group selected from an alcohol, amine, nitrile, ester or carboxyl functional group in a pure single type functional group or as a mixture of combinations.

The repetitive and consecutive reactions of the present invention are performed by (i) α,β-unsaturated ester and nitrile as monomers and (ii) supported metal catalysts and metal hydrides as the reagents.

Examples of α,β-unsaturated esters are linear and branched alkyl esters and aryl esters, the most preferred among them is tert-butyl acrylate. Example of α,β-unsaturated nitriles are a series of alkyl and aryl substituted acrylonitriles, the most preferred among them is unsubstituted acrylonitrile.

Embodiments of this invention comprising the products as well as process steps of this invention are as follows:

In the first embodiment of the invention, the low molecular weight dendritic scaffolds of molecular weight less than 3600 g mol$^{-1}$, with ester units present at the surfaces, as described in Rama Krishna and Jayaraman (2003) are used as the initiator to construct the dendritic macromolecules. The number of ester units at the peripheries varies between 4 and 16, depending on the chosen low molecular weight dendritic scaffold. Accordingly, the molecular weights of the dendritic scaffolds are in the range of 600-3600 g mol$^{-1}$. The functional group conversion, namely, a reduction, provides alcohol functionalities at the peripheries, the number of such groups vary between 4 and 16. Formula 1 describes the structure of the dendritic macromolecule of this embodiment 1 as:

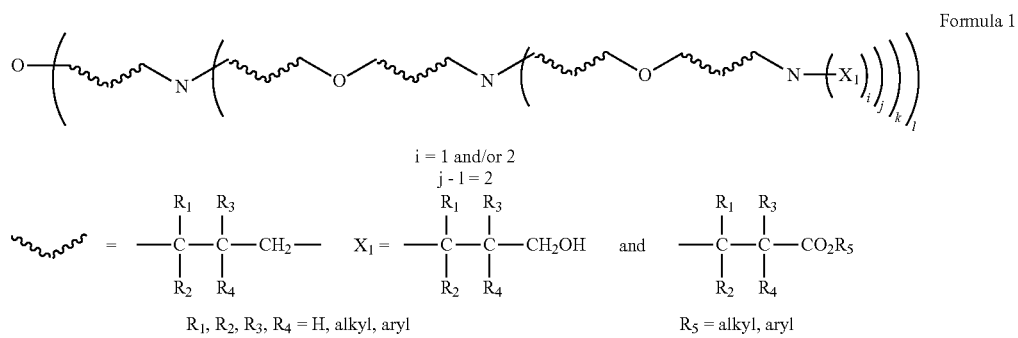

Formula 1

According to the formula 1, the product of the third generation dendritic structure contains x number of alcohol units and 16−x number of ester units present at the surfaces of the dendritic macromolecules. More preferably, the product in formula 1 contains 16 alcohol units. When this generation is targeted for the synthesis of next higher generation through subsequent steps, the presence of 16 alcohol units in this generation is essential. In addition to the example given above, the larger generation dendritic macromolecules of this invention contain hydroxyl units in the progression (i) x number of alcohol units in the fourth generation dendritic structure and 32−x number of ester units, with more preferable x being 32; (ii) x number of alcohol units in the fifth generation dendritic structure and 64−x number of ester units, with more preferable x being 64; (iii) x number of alcohol units in the sixth generation dendritic structure and 128−x number of ester units, with more preferable x being 128; (iv) x number of alcohol units in the seventh generation dendritic structure and 256−x number of ester units, with more preferable x being 256; (v) x number of alcohol units in the eighth generation dendritic structure and 512−x number of ester units, with more preferable x being 512. In general when each of the generation is targeted for the synthesis of the next higher generation through subsequent steps, then the presence of the maximum number of alcohol units is essential in that generation.

uct could be straight away subjected to further step of reiterative reaction. For the objective of constructing fourth generation, however, the same protocol failed to work. Further reiterative reaction worked for adding fourth or higher generation only after isolation of the pure product from the reaction mixture. This isolation may be done by various methods. In this invention, the said isolation was achieved by differential solubility. When lithium aluminium hydride is used as the reducing agent, the byproducts LiOH and Al(OH)$_3$, arising after the work-up of the reaction, are removed by: (i) washing the crude product with water; (ii) filtration; (iii) removal of water under reduced pressure; (iv) washing the product with MeOH; (v) filtration; (vi) removal of MeOH under reduced pressure and (vii) extraction of the product with CHCl$_3$ and removal of the solvents under reduced pressure. If required, the above process is repeated to eliminate any inorganic byproducts that may still remain.

The dendritic macromolecules fully carrying alcohol functionalities at the surfaces are proceeded further to generate larger dendritic structure, through reaction of the alcohol functionalities with α,β-unsaturated nitriles. This reaction provides saturated β-cyano ethyl ethers, wherein the alcohol units are converted to β-cyano ethyl ethers. Formula 2 provides an example of the second embodiment of the invention, as follows:

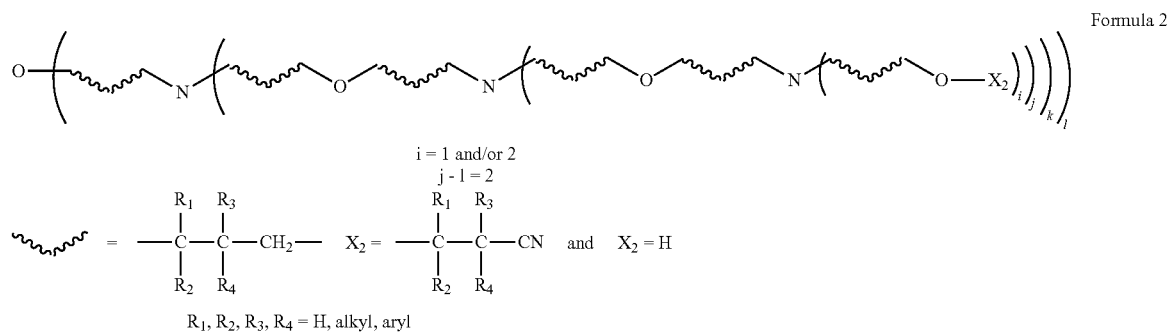

Formula 2

$i = 1$ and/or 2
$j - 1 = 2$ $R_1, R_2, R_3, R_4 = $ H, alkyl, aryl

The reduction reaction was achieved with total conversion from ester to alcohol when 1.3 molar equivalents of a metal hydride per unit of ester was used by Rama Krishna & Jayaraman (2003). However, the same conversion of surface ester groups to surface alcohol groups achieved under same conditions was only partial and not total and such a dendrimer was not fit for addition of fourth generation. To ensure that reduction of functional groups at the periphery to alcohol is total, it was found that addition of at least 2 molar equivalents of metal hydride were added per unit of ester.

The reduction of esters to alcohols is performed in a solvent and in the presence of a metal hydride. Suitable metal hydrides are lithium aluminium hydride, alkyl derivatives of lithium aluminium hydride, combination of lithium borohydride and AlCl$_3$. The preferable metal hydride among these is lithium aluminium hydride. The solvents for the reduction are THF (tetrahydrofuran), diethyl ether, dioxane, toluene and hexanes. The most preferable solvent is THF. The molar ratio of metal hydride generally is 0.5 to 4 per one ester unit, the preferable molar ratio of the metal hydride is 2 per unit of ester to ensure complete conversion.

After the conversion of the surface ester functionalities to alcohol functionalities, in the protocol of Rama Krishna & Jayaraman (2003), the reaction mixture containing the prod- According to the formula 2, the product contains x number of nitrile units and 16−x number of alcohol units present at the surfaces of the dendritic macromolecules. More preferably, the product in formula 2 contains 16 nitrile units. When this generation is targeted for the synthesis of next higher generation through subsequent steps, the presence of 16 nitrile units in this generation is essential. In addition to the example given above, the larger generation dendritic macromolecules of this invention contain nitrile units in the progression (i) x number of nitrile units in the fourth generation dendritic structure and 32−x number of alcohol units, with more preferable x being 32; (ii) x number of nitrile units in the fifth generation dendritic structure and 64−x number of alcohol units, with more preferable x being 64; (iii) x number of nitrile units in the sixth generation dendritic structure and 128−x number of alcohol units, with more preferable x being 128; (iv) x number of nitrile units in the seventh generation dendritic structure and 256−x number of alcohol units, with more preferable x being 256; (v) x number of nitrile units in the eighth generation dendritic structure and 512−x number of alcohol units, with more preferable x being 512.

In general when each of the generation is targeted for the synthesis of the next higher generation through subsequent steps, then the presence of the maximum number of nitrile units is essential in that generation.

The reaction of the conversion of the alcohol functionalities to the nitrile functionalities requires the presence of an alkali and a solvent. The alkalis that can be used include NaOH, KOH, Ca(OH)$_2$ and Mg(OH)$_2$. The most preferred among these alkalis is an aqueous solution of NaOH.

Up to third generation, conversion of alcohol surface functionalities to the nitrile functionalities achieved was total and easily achieved when 1.25 molar equivalents of nitrile were used, added in one single lot and reaction time was 6 hours. This molar equivalent was, however, not sufficient for ensuring total conversion for fourth and higher generations. The need to add more equivalents of acrylonitrile could perhaps be because the higher generations encounter a progressively increasing steric hindrance at the reactive sites present in the peripheries and more equivalents of the reagents help to drive the reaction to completion. It was seen that in order to ensure total conversion of alcohol to nitriles in fourth generation and above, at least 4 molar equivalents or more of the nitrile were required per unit of the hydroxyl group; and that too not in one single lot but in divided lots added at an interval. Thus, one lot is added in the initial stage, one more after several hours, one more lot after several hours. The reaction time was several hours, or a couple of days for the fourth or higher generations.

It was also found out that for the reaction to proceed further for addition of fourth generation and higher generations, it was necessary that the by-products, bis(cyanoethyl ether) and 2-cyano ethanol were removed by liquid-liquid extraction by hexane and methanol-water mixture, and further by column chromatography. In absence of this step too, the separation of the higher generation dendrimer from the by-product was not possible.

In the subsequent preparations, the nitrile functionalities present at the surfaces of dendrimers are proceeded through a functional group conversion, by which the nitrile functionalities are converted to primary amine functionalities through a reduction using supported metal catalysts, such as Raney alloys, the more preferable among the Raney alloys being Raney cobalt.

Formula 3 provides an example of the third embodiment of the present invention, as follows:

thesis is between 0.01-4.0 mM, more preferably between 0.1-0.4 mM and the weight ratio of the nitrile compound to the supported metal catalyst is generally 1:15 and, most preferably in the range of 1:3 to 1:7. The substantially nitrile functionalized dendritic macromolecules are subjected to reduction, using supported metal catalysts, such as Raney alloys, the more preferable among the Raney alloys being Raney cobalt. The reduction requires positive pressure of hydrogen gas, maintained at a higher pressure. The reaction is conducted in water, an alcohol such as MeOH may be added if required.

The hydrogen gas pressure is generally in the range of 20-70 atm, more preferably between 40-50 atm. The reaction temperature is generally maintained between 60-85° C., more preferably at ~70° C. After the reaction, the supported metal catalyst can be removed by filtration. Alternatively, a magnetic pellet picker can be used to remove the catalyst.

According to the formula 3, the product contains x number of amine units and 16−x number of nitrile units present at the surfaces of the dendritic macromolecules. More preferably, the product in formula 3 contains 16 amine units. When this generation is targeted for the synthesis of next higher generation through subsequent steps, the presence of 16 amine units in this generation is essential. In addition to the example given above, the larger generation dendritic macromolecules of this invention contain amine units in the progression (i) x number of amine units in the fourth generation dendritic structure and 32−x number of nitrile units, with more preferable x being 32; (ii) x number of amine units in the fifth generation dendritic structure and 64−x number of nitrile units, with more preferable x being 64; (iii) x number of amine units in the sixth generation dendritic structure and 128−x number of nitrile units, with more preferable x being 128; (iv) x number of amine units in the seventh generation dendritic structure and 256−x number of nitrile units, with more preferable x being 256; (v) x number of amine units in the eighth generation dendritic structure and 512−x number of nitrile units, with more preferable x being 512. In general when each of the generation is targeted for the synthesis of the next higher

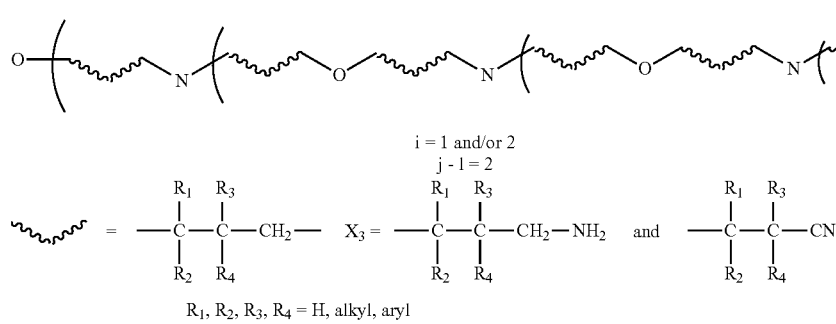

Formula 3

Up to third generation, the reduction of nitrile functionalities to primary amine was fully achievable by using a concentration of above 6 mM of nitrile compound in water. These conditions did not work for construction of fourth generation and above and for that purpose. The reduction reaction of the higher generations is found to require much lower concentrations than the reduction of lower generations. The higher concentration of the solution for the higher generation do not lead to a clean reaction, thereby preventing the progress of the synthesis. The concentration of the nitrile compound in water that worked for fourth and higher generation dendrimer syngeneration through subsequent steps, then the presence of the maximum number of amine units is essential in that generation.

In the fourth embodiment of the invention, the amine functionalities present in the surface of the dendritic macromolecules are subjected through a chemical reaction with an α,β-unsaturated ester, leading to the formation of ester functionalities at the surfaces. The number of ester functionalities thus formed will be up to twice the number of amine functionalities present in the starting material of this reaction. Formula 4 provides an example of this embodiment of invention, as follows:

tion of less t-substituted ester substituted product which can not be considered further for higher generation dendrimer. The ratio of tert-butyl acrylate to each amine functionalities

Formula 4

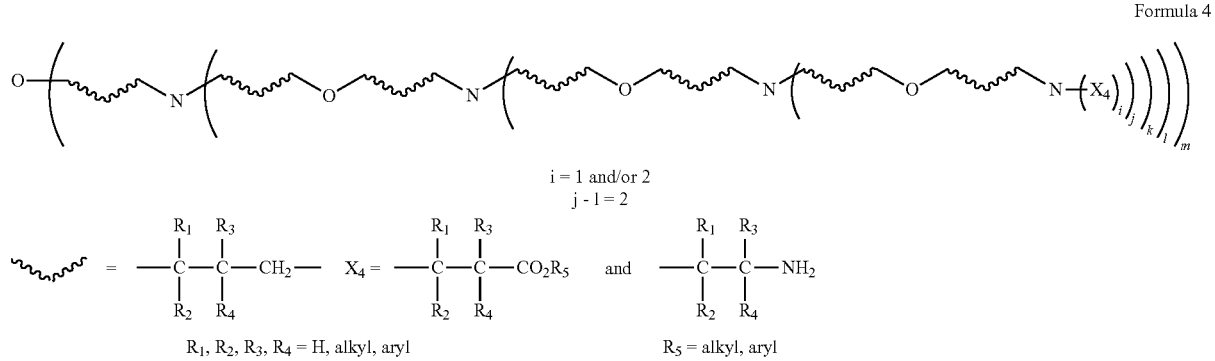

It is preferable that all the amine functionalities on the surface are converted to ester functionalities, at least when a fifth generation is desired to be added to this fourth generation dendrimer. However, if addition of fifth generation is not the objective, it is conceivable that, as a matter of preference or otherwise, on account of incomplete reactions, both the functionalities i.e. primary amine and ester shall be present on the surface in varying proportions.

According to the formula 4, the product contains x number of ester units and 32−x number of amine units present at the surfaces of the dendritic macromolecules. More preferably, the product in formula 4 contains 32 ester units. When this generation is targeted for the synthesis of next higher generation through subsequent steps, the presence of 32 ester units in this generation is essential. In addition to the example given above, the larger generation dendritic macromolecules of this invention contain ester units in the progression (i) x number of ester units in the fourth generation dendritic structure and 32−x number of amine units, with more preferable x being 32; (ii) x number of ester units in the fifth generation dendritic structure and 64−x number of amine units, with more preferable x being 64; (iii) x number of ester units in the sixth generation dendritic structure and 128−x number of amine units, with more preferable x being 128; (iv) x number of ester units in the seventh generation dendritic structure and 256−x number of amine units, with more preferable x being 256; (v) x number of ester units in the eighth generation dendritic structure and 512−x number of amine units, with more preferable x being 512.

In general when each of the generation is targeted for the synthesis of the next higher generation through subsequent steps, then the presence of the maximum number of ester units is essential in that generation.

The products formed in each step in the last cycle of iterative reactions can be stopped to provide the dendritic macromolecules with defined functionality at the surfaces.

The amine resulting from the above step is taken through reaction with an α,β-unsaturated esters, the most preferable ester being tert-butyl acrylate. Alcoholic solvents can be used generally to conduct the reaction of amine functionalized dendrimers, the most preferable solvent is MeOH. Addition of 3.33 molar equivalents of t-butyl acrylate per unit of amine worked very well up to construction of three generations. However, for fourth generation construction, this molar ratio led to less t-butyl ester substituted dendritic product and formation of polymer-like polar impurity leading to formation of less t-substituted ester substituted product which can not be considered further for higher generation dendrimer. The ratio of tert-butyl acrylate to each amine functionalities present at the surfaces of the dendritic macromolecule required for satisfactory conversion is in excess of 3.33:1 up to 200:1. Most preferable ratio is in the range of 5-60 molar equivalent of tert-butyl acrylate per one unit of amine present at the surfaces.

At the end of the reaction, the excess tert-butyl acrylate can be recovered by distillation. Column chromatography, using neutral alumina matrix, of the crude product is carried out usually to obtain the pure ester functionalized dendritic macromolecules.

The embodiments 1-4 described above are necessary to complete the constitution of the dendritic macromolecules of the present invention. Thus, each cycle involves a set of four distinct reactions to complete the cycle. Thus, initiating from a low molecular weight dendritic molecule with 16 ester functionalities at the surfaces requires full five cycles to reach a dendritic macromolecule presented with 512 ester functionalities at the surfaces, wherein complete reactivities of the functional groups occurred at the surfaces of the dendritic macromolecule.

The dendritic macromolecules of this invention can be used in many applications. Various applications, in such areas as, medical, healthcare, environmental, catalysis, engineering, electronics and opto-electronics are targeted for promotion of better performances, characteristics and efficiencies through the dendrimer technology.

The important molecular feature available for the dendritic macromolecules is the presence of large of number of dense peripheral functional groups. This large number of peripheral functional groups provides the opportunity for attaching, for example, drug molecules, fragrant molecules, antibodies, antigens, nucleotides, nucleosides, peptides, proteins and carbohydrate ligands etc. Also, the low viscosity of the dendritic macromolecules, in comparison to random polymers of the similar molecular weights, may find applications in the area of, for example, lubricants in automotive oils.

Another important physical attribute of these new class of dendrimers is that their radius is considerably larger than dendrimers of the type as described in U.S. Pat. No. 4,507,466; U.S. Pat. No. 4,558,320 and U.S. Pat. No. 4,737,550, relating to the poly(amido amine) series of dendrimers and WO 93/14147, U.S. Pat. No. 5,698,662, relating to the poly(propylene imine) series of dendrimers. The radius of a particular generation of the dendrimers of the present invention would relate to next higher generation of, for example, the poly(amido amine) dendrimers. This important physical attribute of the dendrimers of the present invention originates from the larger linkers lengths, connecting the branch functionalities. The utility of the larger radius of the dendrimers, with attendant lesser molecular weights, can be envisaged in applications such as drug delivery. The dendritic base platforms with larger sizes and lesser molecular weights will have beneficial effects upon conjugation with drugs. The larger through-bond distances between the branch functionalities of the present invention also allow them to be more flexible and less rigid. The presence of ether and amine functionalities of the dendrimers of this invention makes them analogous to the functionalities present individually in polymers such as poly(ethylene glycol) and poly(ethylene imine). The lower toxicity profile of these types of functionalities make the molecules derived from thereof to be invoked in applications, such as, drug delivery vehicles, drug formulations, skin care formulations, gene delivery vehicles, vehicles for conjugation with pharmacologically important nucleosides, nucleotides, peptides, proteins, carbohydrates and other synthetic agents. The series of the dendrimers have defined internal voids and cavities that can encapsulate small molecules, relevant in, for example, enhancing the bioavailability of a drug, or a drug encapsulation or a toxic chemical encapsulation or a biocide encapsulation etc. Thus, from the point of view of various applications, lower generation dendrimers of the present invention can be utilized in place of higher generation dendrimers of the type as described in above disclosures, in order, for example, to avoid toxicity towards biological objects.

The technology of the instant Application is further elaborated with the help of following examples. However, the examples should not be construed to limit the scope of the invention.

Throughout this specification, unless the context does not permit that meaning, mention of a singular, with or without the phrase "one or more of" shall include pleural also of the same or any of functional equivalent of the same, any homologue or analogue of the same and also includes mention of any one of a homologue or an analogue them or more of them separately or in a combination. Thus, mention of "alkyl" includes mention of any one or more than one amongst methyl, ethyl, propyl and the like either separately or in a combination; mention of "fragrance" includes any one or more of a fragrant molecule either separately or in combination. Conversely, unless context does not permit, use of a plural also includes mention of a singular or any one of a homologue or analogue or equivalent of the same. Thus mention of "functional groups" includes use of only one functional group also or any functional group capable of discharging equivalent function if the illustrated functional group is replaced by a functional group which is not specifically illustrated in the specification. Further, description of the embodiments, examples, compositions described in this specification are for the illustrative purpose only and are not to be construed to limit the scope of subject matter that is inherent in the claims and any variations that are obvious to a person skilled in the art and any possible equivalent and capable of meeting the claimed invention and not expressly mentioned in this specification are also construed to be included within the scope of claims.

Example: 1

A mixture of the 16-alcohol functionalized dendritic macromolecule (5.0 g) and of aq 40% NaOH (0.4 mL) was added with acrylonitrile (2.15 mL), at 0° C. and stirred at room temperature for 15 h. Additional amount of acrylonitrile (2.15 mL) was added portion wise, and this additional amount was added again after 8 h of stirring and the reaction was monitored (TLC alumina matrix; eluant: 6% MeOH/CHCl$_3$, R$_f$ of the required 16-nitrile functionalized dendritic macromolecule: 0.45). The solution was filtered through celite using chloroform, and washed with water and the solvents evaporated under reduced pressure. The crude reaction mixture was dissolved in aqueous MeOH, subjected to liquid-liquid extraction with hexane to remove ~70% of bis(2-cyano ethyl ether). Finally, the reaction mixture was subjected to column chromatography (neutral alumina, 100-300 mesh size), afforded the 16-nitrile functionalized dendritic macromolecule, as a colorless gummy liquid. Yield: 6.33 g.

Example: 2

In a 2 L hydrogenation reactor vessel, a mixture of sixteen nitrile-functionalized dendritic macromolecule (1.5 g) in distilled water (1.2 L) and Raney Co (Aldrich Inc. USA) (4.0 g) was hydrogenated in the presence of hydrogen gas (46 atm.). The temperature was maintained in the range of 70-75° C. After 3.5 h, the reaction mixture was cooled and the spent Raney cobalt was recovered using a magnetic pellet picker. Methanol was added to wash the compound from catalyst and to remove the catalyst from pellet picker, flushed with water and the water layer was concentrated at 55° C. under reduced pressure. For easy removal of water, azeotrope mixture was formed by adding dioxane solvent and evaporated quickly. To the resulting reaction mixture methanol was added and filtered. The filtrate was concentrated and dried to afford the corresponding 16 amine-functionalized dendritic macromolecule. Yield: 1.53 g.

Example: 3

A solution of 16 amine terminated dendritic macromolecule (1.53 g) in methanol (50 mL) and tert-butyl acrylate (filtered through pad of alumina prior to the addition) (10 mL) was stirred vigorously for 72 h. The reaction was monitored (TLC alumina matrix, eluant: 3% MeOH/CHCl$_3$, R$_f$ of the 32 ester functionalized dendritic macromolecule: 0.52). Excess tert-butyl acrylate and methanol were removed under reduced pressure after completion of the reaction. Addition of petroleum ether helped to precipitate the polar impurity and it was separated by filtration through filter paper. Subsequent evaporation of the solvent afforded the 32 ester terminated dendritic macromolecule. Further purification was performed by column chromatography (neutral alumina; eluant: CHCl$_3$:MeOH), to afford the 32 ester functionalized dendritic macromolecule. Yield: 3.15 g.

Example: 4

A solution of 32-ester functionalized dendrimer (4.0 g) in THF (150 mL) was added dropwise to a suspension of LiAlH$_4$ (1.34 g) in THF (50 mL), over a period of 15 min at 0° C. and the stirring was continued for 4 h at room temperature. After completion of the reaction, the mixture was cooled to 0° C., quenched with ice, diluted with water, passed through celite, and the filtrate concentrated under reduced pressure. The crude reaction mixture was added with MeOH, filtered, and the filtrate concentrated. The resulting reaction mixture was extracted CHCl$_3$. Removal of the solvents afforded the 32-alcohol functionalized dendritic macromolecule. Yield: 2.76 g.

Example: 5

A mixture of the 32-alcohol functionalized dendritic macromolecule (5.0 g) and of aq 40% NaOH (0.4 mL) was added with acrylonitrile (2.02 mL), at 0° C. and stirred at room temperature for 15 h. Additional amount of acrylonitrile (2.02 mL) was added portion wise, and this additional amount was added again after 8 h of stirring and the reaction was monitored (TLC alumina matrix; eluant: 6% MeOH/CHCl$_3$, R$_f$ of the required 32-nitrile functionalized dendritic macromolecule: 0.6). The solution was filtered through celite using chloroform, and washed with water and the solvents evaporated under reduced pressure. The crude reaction mixture was dissolved in aqueous MeOH—H$_2$O (~70:30), subjected to liquid-liquid extraction with hexane to remove ~70% of bis (2-cyano ethyl ether). Finally, the reaction mixture was subjected to column chromatography (neutral alumina, 100-300 mesh size), to afford the 32-nitrile functionalized dendritic macromolecule, as a colorless gummy liquid. Yield: 5.23 g.

Example: 6

In a 2 L hydrogenation reactor vessel, a mixture of 32 nitrile-functionalized dendritic macromolecule (1.0 g) in distilled water (1.2 L) and Raney Co (Aldrich Inc. USA) (5.0 g) was hydrogenated in the presence of hydrogen gas (46 atm.). The temperature was maintained in the range of 70-75° C. After 3.5 h, the reaction mixture was cooled and the spent Raney cobalt was recovered using a magnetic pellet picker. Methanol was added to wash the compound from catalyst and to remove the catalyst from pellet picker, flushed with water and the water layer was concentrated at 55° C. under reduced pressure. For easy removal of water, azeotrope mixture was formed by adding dioxane solvent and evaporated quickly. To the resulting reaction mixture methanol was added and filtered. The filtrate was concentrated and dried to afford the corresponding 32 amine-functionalized dendritic macromolecule. Yield: 1.01 g.

Example: 7

A solution of 32 amine terminated dendritic macromolecule (1.01 g) in methanol (50 mL) and tert-butyl acrylate (filtered through pad of alumina prior to the addition) (10 mL) was stirred vigorously for 72 h. The reaction was monitored (TLC alumina matrix, eluant: 3% MeOH/CHCl$_3$, R$_f$ of the 64 ester functionalized dendritic macromolecule: 0.66). Excess tert-butyl acrylate and methanol were removed under reduced pressure after completion of the reaction. Addition of petroleum ether helped to precipitate the polar impurity and it was separated by filtration through filter paper. Subsequent evaporation of the solvent afforded the 64 ester terminated dendritic macromolecule. Further purification was performed by column chromatography (neutral alumina; eluant: CHCl$_3$: MeOH), to afford the 64 ester functionalized dendritic macromolecule. Yield: 1.70 g.

Example 8

Synthesis of 32-Salicylate Ester Functionalized Dendritic Macromolecule

To a mixture of methyl salicylate (1.90 g, 12.5 mmol) and NaHCO$_3$ (1.2 g) in 1,2-dimethoxy ethane (40 mL), a solution of 32-chloride functionalized dendritic macromolecule (1.50 g, 0.26 mmol) in 1,2-dimethoxy ethane (30 mL) was added at 0° C., stirred at room temperature for 12 h. The reaction mixture was filtered, the filtrate evaporated under reduced pressure. The resulting residue was dissolved in CH$_2$Cl$_2$ (50 mL), washed with water, dried and evaporated to afford 32-salicylate ester functionalized dendritic macromolecule. Yield: 2.65 g.

The invention claimed is:

1. A dendritic macromolecule, wherein: (a) the branch points are tertiary amines; (b) the branches are linked together through linkers; (c) the linkers comprise an oxygen atom of an ether; (d) the heteroatoms are separated by a substituted or non-substituted linear three methylene linker; and (e) the dendritic macromolecule has four or more generations.

2. The dendritic macromolecule of claim 1, wherein the dendritic macromolecule has a number of surface functional groups, the number of the surface functional groups is 16 to n=(4×2$^y$); wherein "n"=the number of surface functional groups of a dendrimer generation, and "y"=the generation number of the immediately preceding generation.

3. The dendritic macromolecule of claim 1, wherein the branches are a number of symmetrically sited branches ranging from 3 to 8, and 16 to at least 512 peripheral groups are present.

4. The dendritic macromolecule of claim 1, wherein substituents on the linear three methylene linker are selected from the group consisting of one or more of an alkyl, a branched alkyl and an aryl group.

5. The dendritic macromolecule of claim 4, wherein the alkyl, branched alkyl and aryl substituents on the linear three methylene linker are present on α- and β-methylene groups; and γ-methylene group is unsubstituted.

6. The dendritic macromolecule of claim 1, wherein the repeating unit of the dendritic macromolecule is:

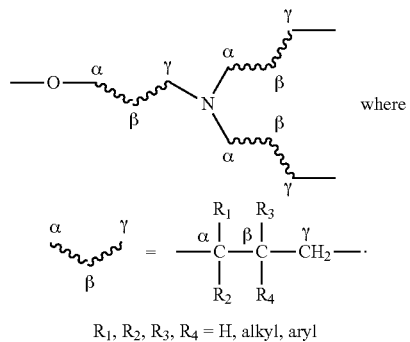

R$_1$, R$_2$, R$_3$, R$_4$ = H, alkyl, aryl

7. A process for preparing a dendritic macromolecule having four or more generations of symmetrically sited branches, tertiary amines as branch points, branches linked together through linkers comprising an oxygen atom of an ether, and heteroatoms separated by a substituted or non-substituted linear three methylene linker, comprising reiterative steps of:
(a) reacting, in the presence of an alkali, alcohol units of an isolated lower dendritic molecule with molar equivalents of α,β-unsaturated nitrile, thereby installing surface nitrile groups and isolating the resulting compound from by-products; wherein (i) at least about 4 molar equivalents or more of nitrile units are required per unit of hydroxyl group; (ii) adding the nitrile, at time intervals, in more than one lot; and (iii) carrying out the reaction for more than six hours;
(b) converting the surface nitrile groups to corresponding amines through mediating by supported metal catalysts and hydrogen gas and isolating the resulting compound; wherein (i) the concentration of the nitrile compound in water is between 0.01-4.0 mM, (ii) the weight ratio of the nitrile compound to the supported metal catalyst is 1:15, and (iii) heating is carried out for at least 3.5 hours;

(c) reacting the amine functional groups with α,β-unsaturated esters and isolating the resulting compound; wherein the ratio of ester units to each unit of amine functional group required for conversion is 3.33:1 to 200:1; and (d) preparing a higher generation dendritic molecule by converting the surface ester units to the corresponding alcohol units through mediating by metal hydride reagents and isolating the resultant compound and subjecting the resultant compound to the next cycle of reiterative reaction, comprising: flushing with water, adding dioxane to water layer and removing azeotrope of water by concentrating at 55° C. under reduced pressure; wherein the molar ratio of metal hydride is 0.5 to 4 per one ester unit.

8. The process of claim 7 wherein:
(a) the alkali is 40% aqueous solution of sodium hydroxide, the by-products of the reaction of alcohol units of the isolated lower dendritic molecule with molar equivalents of α,β-unsaturated nitrile are bis(cyanoethyl ether) and 2-cyano ethanol and are removed by a combination of liquid-liquid extraction and column chromatography;
(b) the supported metal catalyst is selected from the group consisting of Raney alloys; and
(c) the metal hydride reagent is lithium aluminum hydride.

9. The process of claim 7, further comprises isolating and purifying the end product of:
(a) reiterative reaction step (a) of claim 7 by steps of: (i) dissolving the crude reaction mixture in aqueous methanol-water, (ii) subjecting to liquid-liquid extraction with hexane to remove about 70% of bis(2-cyano ethyl ether), and (iii) subjecting the reaction mixture to column chromatography on neutral alumina, 100-300 mesh size, to get the nitrile functionalized dendritic macromolecule;
(b) reiterative reaction step (b) of claim 7 by steps of: (i) cooling the reaction mixture, (ii) recovering the supported metal catalyst using a magnetic pellet picker, (iii) adding methanol to wash the compound from catalyst, (iv) flushing with water to remove the catalyst from pellet picker, (v) concentrating the water layer at 55° C. under reduced pressure, (vi) adding dioxane solvent to form an azeotrope with water and evaporating the same, (vii) adding methanol to the resulting reaction mixture and filtering the same, and (viii) concentrating the filtrate and drying to get the amine-functionalized dendritic macromolecule,
(c) reiterative reaction step (c) of claim 7 by steps of: (i) adding petroleum ether to the reaction mixture to precipitate the polar impurity, (ii) separating the precipitated polar impurity by filtration, (iii) evaporating the solvent to get the ester terminated dendritic macromolecule, and (iv) purifying further by column chromatography on neutral alumina by using chloroform:methanol as eluent,
(d) reiterative reaction step (d) of claim 7 by steps of: (i) washing the crude product with water; (ii) filtering the washed crude product; (iii) removing of water under reduced pressure; (iv) washing the product with methanol; (v) filtering the product washed with methanol; (vi) removing the methanol under reduced pressure; (vii) extracting a product with chloroform and removing the solvents under reduced pressure, and (viii) repeating the isolating and purifying of the alcohol functionalized dendritic macromolecule to eliminate any inorganic by-products, if required.

10. The process of claim 7, wherein the lower dendritic molecule is one generation lower than the target dendritic molecule.

11. A composition of matter containing the dendritic macromolecule of claim 1 as an ingredient and one or more of a physically or chemically attached or encapsulated ingredient or ingredients.

12. The composition of claim 11, wherein the physically or chemically attached or encapsulated ingredient is selected from the group consisting of one or more of a fragrance, a drug, an antibody, an antigen, a nucleotide, a nucleoside, a carbohydrate, a peptide, a protein, and a biocide.

13. The process of claim 7, further comprising one or more of following:
(a) a concentration of the nitrile compound in water of between 0.1-0.4 mM;
(b) a weight ratio of the nitrile compound to the supported metal catalyst being in the range of 1:3 to 1:7;
(c) a ratio of ester units to each unit of the surface amine functional groups required for conversion in the range of 5-60 molar equivalent of tert-butyl acrylate per one unit of surface amine; and
(d) a molar ratio of metal hydride of about 2 per unit of ester.

14. The process of claim 8, wherein the Raney alloy is Raney Cobalt.

15. A method of lubricating an automobile comprising:
adding to an automotive oil a dendritic macromolecule consisting of: (a) the branch points are tertiary amines; (b) the branches linked together through linkers; (c) the linkers comprising an oxygen atom of an ether; (d) the heteroatoms are separated by a substituted or non-substituted linear three methylene linker; and (e) the dendritic macromolecule has four or more generations.

16. The dendritic macromolecule of claim 2, wherein the surface functional groups are uniformly selected from the group consisting of alcohol, nitrile, primary amine, ester and carboxyl.

17. The dendritic macromolecule of claim 2, wherein the surface functional groups are selected from a mixture of two or more of the group consisting of alcohol, nitrile, primary amine, ester and carboxyl.

18. The dendritic macromolecule of claim 1, wherein the number of surface functional groups is a maximum of 16 for the third generation, a maximum of 32 for the fourth generation, a maximum of 64 for the fifth generation, a maximum of 128 for the sixth generation, a maximum of 256 for the seventh generation and a maximum of 512 for the eighth generation.

* * * * *